(12) United States Patent
Lin et al.

(10) Patent No.: US 7,548,661 B2
(45) Date of Patent: Jun. 16, 2009

(54) SINGLE-IMAGE VIGNETTING CORRECTION

(75) Inventors: Stephen Lin, Beijing (CN); Baining Guo, Bellevue, WA (US); Sing Bing Kang, Redmond, WA (US); Yuanjie Zheng, Beijing (CN)

(73) Assignee: Microsoft Corporation, Redmond, WA (US)

( * ) Notice: Subject to any disclaimer, the term of this patent is extended or adjusted under 35 U.S.C. 154(b) by 694 days.

(21) Appl. No.: 11/384,063

(22) Filed: Mar. 17, 2006

(65) Prior Publication Data
US 2007/0146506 A1 Jun. 28, 2007

Related U.S. Application Data

(60) Provisional application No. 60/753,802, filed on Dec. 23, 2005.

(51) Int. Cl.
*G06K 9/40* (2006.01)
(52) U.S. Cl. .............. 382/274; 382/275; 382/282; 358/3.26; 358/3.27
(58) Field of Classification Search .......... 382/274, 382/275, 282; 358/3.26, 3.27, 463
See application file for complete search history.

(56) References Cited

U.S. PATENT DOCUMENTS

| 5,108,179 | A | * | 4/1992 | Myers ............... 356/344 |
| 5,436,980 | A | * | 7/1995 | Weeks et al. ......... 382/141 |
| 5,602,896 | A | * | 2/1997 | Diepstraten ......... 378/98.7 |
| 6,610,984 | B2 | * | 8/2003 | Knauth et al. ........ 250/352 |
| 6,919,892 | B1 | * | 7/2005 | Cheiky et al. ........ 345/473 |

OTHER PUBLICATIONS

Asada, N., A, Amano, and M. Baba, Photometric calibration of zoom lens system, *Proc. Int'l. Conf. on Pattern Recognition*, 1996, pp. 186-190.
Carson, C., S. Belongie, H. Greenspan, and J. Malik, Blobworld: Image segmentation using expectation-maximization and its application to image querying, *IEEE Trans. PAMI*, 2002, vol. 24, No. 8, pp. 1026-1038.
Comaniciu, D., and P. Meer, Mean shift: A robust approach toward feature space analysis, *IEEE Trans. PAMI*, 2002, vol. 24, No. 5, pp. 603-619.
Goldman, D., J. Chen, Vignette and exposure calibration and compensation, *Proc. ICCV*, 2005, pp. 899-906.
Jia, J., and C. Tang, Tensor voting for image correction by global and local intensity alignment, *IEEE Trans. PAMI*, 2005, vol. 27, No. 1, pp. 36-50.

(Continued)

*Primary Examiner*—Yosef Kassa
(74) *Attorney, Agent, or Firm*—Lyon & Harr, LLP; Richard T. Lyon

(57) ABSTRACT

A system and process for determining the vignetting function of an image and using the function to correct for the vignetting is presented. The image can be any arbitrary image and no other images are required. The system and process is designed to handle both textured and untextured segments in order to maximize the use of available information. To extract vignetting information from an image, segmentation techniques are employed that locate image segments with reliable data for vignetting estimation. Within each image segment, the system and process capitalizes on frequency characteristics and physical properties of vignetting to distinguish it from other sources of intensity variation. The vignetting data acquired from segments are weighted according to a presented reliability measure to promote robustness in estimation.

20 Claims, 6 Drawing Sheets

OTHER PUBLICATIONS

Kang, S., and R. Weiss, Can we calibrate a camera using an image of a flat textureless lambertian surface?, *European Conf. on Computer Vision*, 2000, pp. 640-653.

Litvinov, A., and Y. Schechner, Addressing radiometric non-idealities: A unified framework, *Proc. CVPR*, 2005, pp. 52-59.

Rissanen, J., Modelling by shortest data description, *Automatica*, 1978, vol. 14, pp. 465-471.

Tang, M., and S. Ma. General scheme of region competition based on scale space, *IEEE Trans. PAMI*, 2001, vol. 23, No. 12, pp. 1366-1378.

Yu, W., Practical anti-vignetting methods for digital cameras, *IEEE Trans. on Cons. Elect.*, 2004, vol. 50, pp. 975-983.

Yu, Wonpil, Y. Chung, and J. Soh, Vignetting distortion correction method for high quality digital imaging, Proceedings of the 17th Int'l Conference on Pattern Recognition, vol. 3, pp. 666-669, 2004.

Zabih, R., and V. Kolmogorov, Spatially coherent clustering using graph cuts, *CVPR 2004*, vol. 2, pp. 437-444.

* cited by examiner

SINGLE-IMAGE VIGNETTING CORRECTION

BACKGROUND

Vignetting refers to the phenomenon of brightness attenuation away from an image's center, and is an artifact that is prevalent in photography. Although perhaps not objectionable to the average viewer at low levels, it can significantly impair computer vision algorithms that rely on precise intensity data to analyze a scene. Applications in which vignetting distortions can be particularly damaging include photometric methods such as shape from shading, appearance-based techniques such as object recognition, and image mosaicing.

Several mechanisms may be responsible for vignetting effects. Some arise from the optical properties of camera lenses, the most prominent of which is off-axis illumination fall-off or the $\cos^4$ law. These contributions to vignetting result from foreshortening of the lens when viewed from increasing angles from the optical axis. Other sources of vignetting are geometric in nature. For example, light arriving at oblique angles to the optical axis may be partially obstructed by the field stop or lens rim.

To determine the vignetting effects in an image, the most straightforward approach involves capturing an image completely spanned by a uniform scene region, such that brightness variations can solely be attributed to vignetting. In such a calibration image, ratios of intensity with respect to the pixel on the optical axis describe the vignetting function. Suitable imaging conditions for this approach, however, can be challenging to produce due to uneven illumination and camera tilt, and the vignetting measurements are valid only for images captured by the camera under the same camera settings. Moreover, a calibration image can be recorded only if the camera is at hand; consequently, this approach cannot be used to correct images captured by unknown cameras, such as images downloaded from the web.

A vignetting function can alternatively be computed from image sequences with overlapping views of an arbitrary static scene. In this approach, point correspondences are first determined in the overlapping image regions. Since a given scene point has a different position in each image, its brightness may be differently attenuated by vignetting. From the aggregate attenuation information from all correspondences, the vignetting function can be accurately recovered without assumptions on the scene.

These previous approaches require either a collection of overlapping images or an image of a calibration scene. However, often in practice only a single image of an arbitrary scene is available. The previous techniques gain information for vignetting correction from pixels with equal scene radiance but differing attenuations of brightness. For a single arbitrary input image, this information becomes challenging to obtain, since it is difficult to identify pixels having the same scene radiance while differing appreciably in vignetting attenuation.

SUMMARY

The present invention is directed toward a system and process to correct for vignetting in an image using just that image. To maximize the use of available information in the image, the technique extracts vignetting information from both textured and untextured regions. In extracting vignetting information from a given region, advantage is taken of physical vignetting characteristics to diminish the influence of textures and other sources of intensity variation. Vignetting information from disparate image regions is also employed to ensure consistency across the regions. As a result, large image regions appropriate for vignetting function estimation are identified. To counter the adverse effects of vignetting on segmentation, the present system and process iteratively re-segments the image with respect to progressively refined estimates of the vignetting function. Additionally, spatial variations in segmentation scale are used in a manner that enhances collection of reliable vignetting data.

In general, the present vignetting correction system and process involves first segmenting an input image using a spatially varying segmentation scale that produces reliable segments exhibiting vignetting that is consistent with prescribed physical vignetting characteristics and that conforms to vignetting observed in other segments. A vignetting function is then estimated for the input image that defines a corrected intensity for each pixel using the reliable segments. This last-computed vignetting function estimate is applied to each pixel of the input image to produce a current refined image. The segmenting and vignetting function estimating is repeated using the current refined image in lieu of the input image and the resulting estimate is applied to the input image to produce a new current refined image. This continues until it is determined that the vignetting function estimate has converged. At that point the last produced current refined image is designated as the final vignetting corrected image.

The segmenting of the input image or the current refined image is accomplished in one embodiment of the present system and process by first segmenting the image at a prescribed initial segmentation scale. Then, for each segment, a reliability factor is computed that represents the degree to which the segment under consideration exhibits consistency with physical vignetting characteristics and conforms to vignetting observed in other segments. In addition, it is determined if the reliability factor of the segment under consideration exceeds a prescribed reliability threshold that indicates the segment is acceptable for vignetting estimation. Whenever the reliability factor does not exceed the reliability threshold, the segment under consideration is recursively segmented at increasingly finer segmentation scales until each of the resulting smaller segments has a reliability factor that exceeds the reliability threshold or becomes less than a prescribed minimum segment size. Those segments determined to have a reliability factor which exceeds the reliability threshold and which are at least as large as the minimum segment size are designated to be reliable segments.

One way of recursively segmenting a segment under consideration involves dividing the segment using a finer segmentation scale than that last employed on the segment to produce a plurality of smaller segments. For each smaller segment produced, its reliability factor is computed and it is determined if the factor exceeds the reliability threshold. Whenever the reliability factor of the smaller segment under consideration does not exceed the reliability threshold, it is determined if the size of the smaller segment is less than a prescribed minimum segment size. If the segment under consideration exceeds the minimum segment size, then the foregoing is repeated for that segment.

It is noted that while the foregoing limitations in existing vignetting correction schemes described in the Background section can be resolved by a particular implementation of a system and process according to the present invention, this system and process is in no way limited to implementations that just solve any or all of the noted disadvantages. Rather, the present system and process has a much wider application as will become evident from the descriptions to follow.

It should also be noted that this Summary is provided to introduce a selection of concepts, in a simplified form, that are further described below in the Detailed Description. This Summary is not intended to identify key features or essential features of the claimed subject matter, nor is it intended to be used as an aid in determining the scope of the claimed subject matter. In addition to the just described benefits, other advantages of the present invention will become apparent from the detailed description which follows hereinafter when taken in conjunction with the drawing figures which accompany it.

DESCRIPTION OF THE DRAWINGS

The specific features, aspects, and advantages of the present invention will become better understood with regard to the following description, appended claims, and accompanying drawings where:

DETAILED DESCRIPTION

In the following description of embodiments of the present invention reference is made to the accompanying drawings which form a part hereof, and in which are shown, by way of illustration, specific embodiments in which the invention may be practiced. It is understood that other embodiments may be utilized and structural changes may be made without departing from the scope of the present invention.

1.0 The Computing Environment

Figure 1:
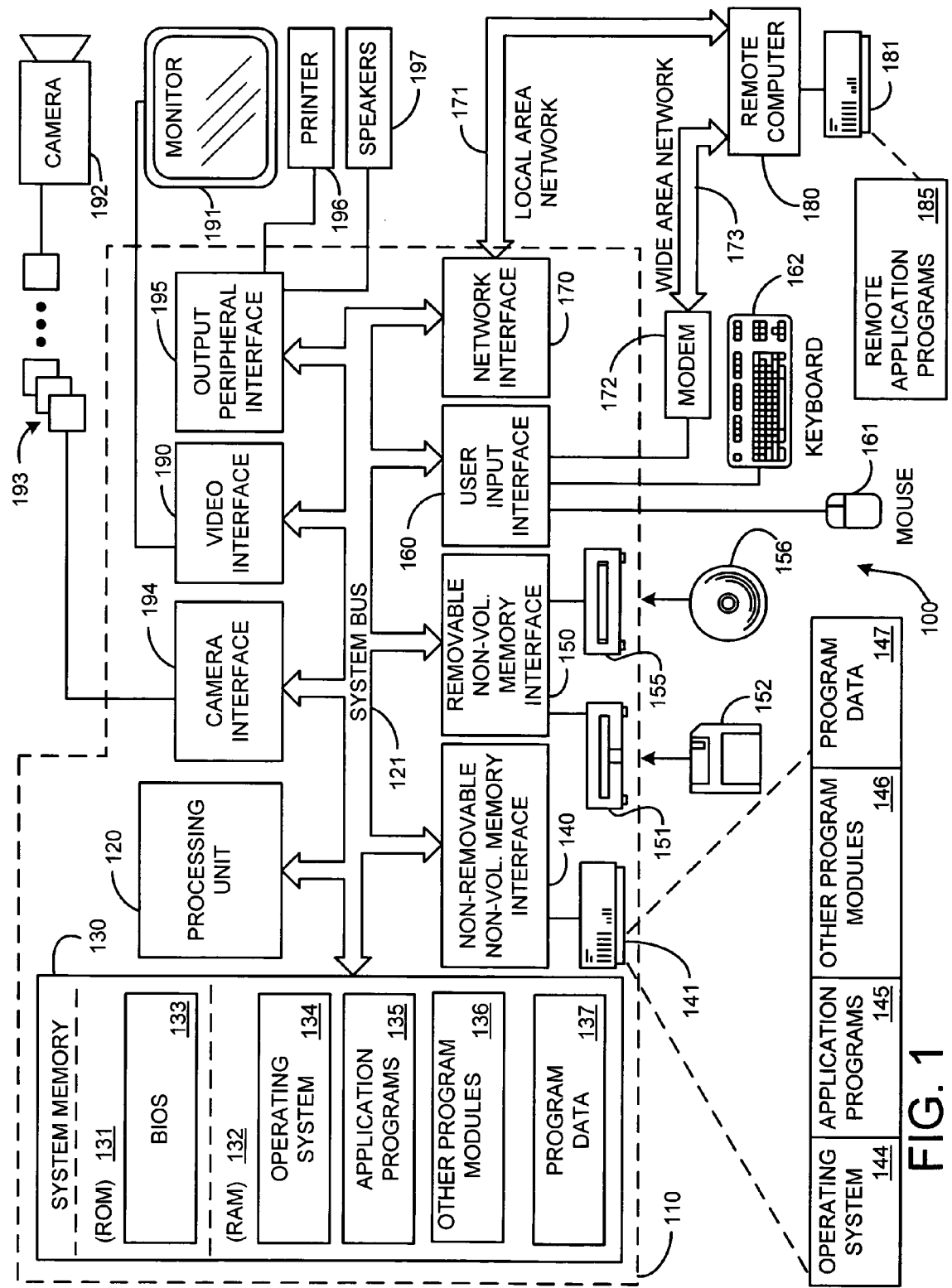
FIG. 1 is a diagram depicting a general purpose computing device constituting an exemplary system for implementing the present invention.

Before providing a description of embodiments of the present invention, a brief, general description of a suitable computing environment in which portions of the invention may be implemented will be described. FIG. 1 illustrates an example of a suitable computing system environment 100. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus 121, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195. A camera 192 (such as a digital/electronic still or video camera, or film/photographic scanner) capable of capturing a sequence of images 193 can also be included as an input device to the personal computer 110. Further, while just one camera is depicted, multiple cameras could be included as input devices to the personal computer 110. The images 193 from the one or more cameras are input into the computer 110 via an appropriate camera interface 194. This interface 194 is connected to the system bus 121, thereby allowing the images to be routed to and stored in the RAM 132, or one of the other data storage devices associated with the computer 110. However, it is noted that image data can be input into the computer 110 from any of the aforementioned computer-readable media as well, without requiring the use of the camera 192.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

The exemplary operating environment having now been discussed, the remaining parts of this description section will be devoted to a description of the program modules embodying the invention.

2.0 Single-Image Vignetting Correction System and Process

Figure 2:
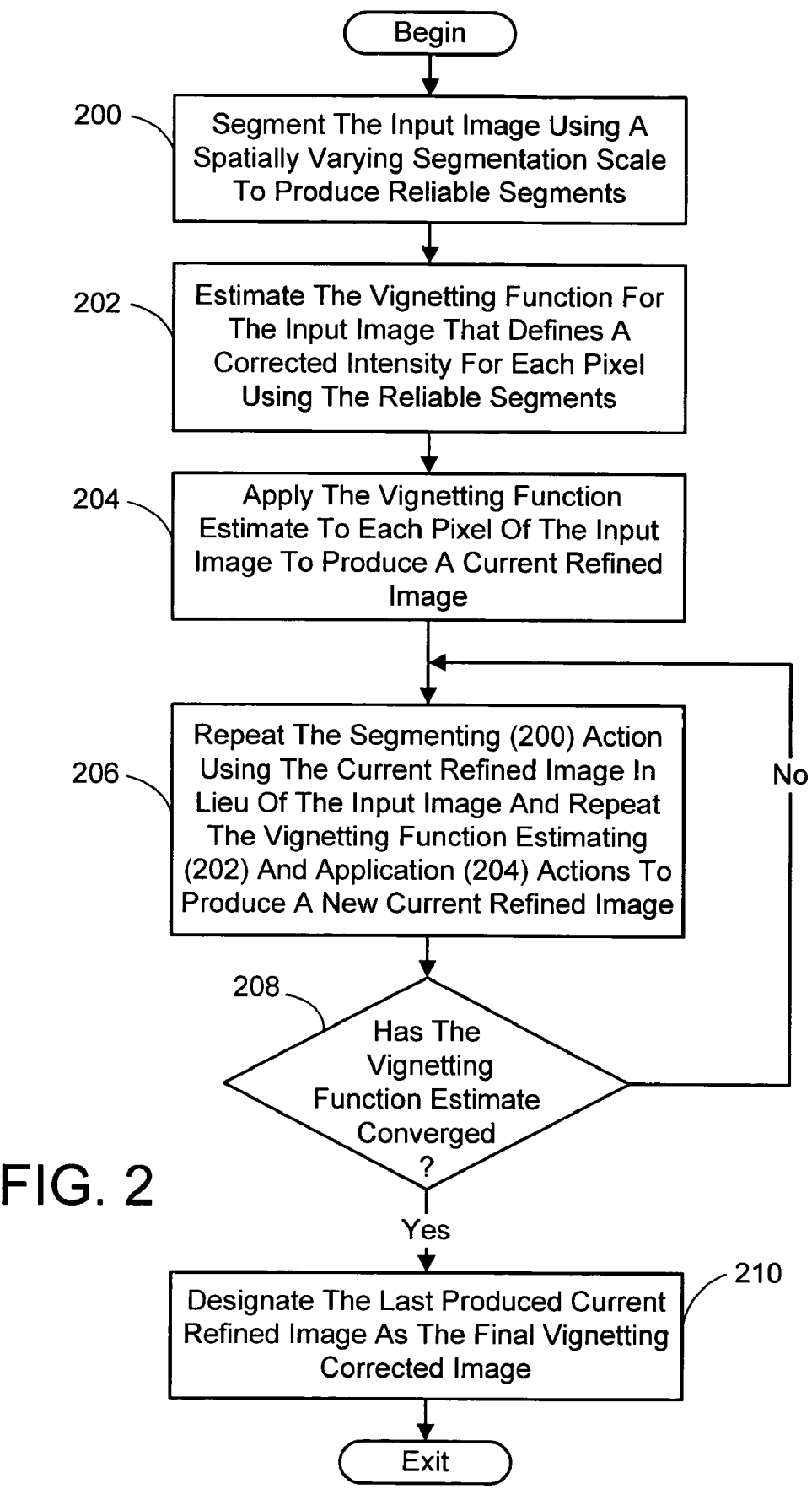
FIG. 2 is a flow chart diagramming a generalized process to correct for vignetting in an image using just the image itself according to the present invention.

The present computer-based system and process to correct for vignetting in an image using just the image itself is generally accomplished via the following process actions, as shown in the high-level flow diagram of FIG. 2. First, an input image is segmented using a spatially varying segmentation scale that produces reliable segments (process action 200). In the context of the present vignetting correction system, a segment is considered reliable if it exhibits vignetting that is consistent with prescribed physical vignetting characteristics and if it conforms to vignetting observed in other segments. A vignetting function is then estimated for the input image that defines a corrected intensity for each pixel using the reliable segments (process action 202). The last-computed vignetting function estimate is applied to each pixel of the input image to produce a current refined image (process action 204). The segmenting and vignetting function estimating actions are repeated using the current refined image in lieu of the input image and the resulting estimate is applied to the input image to produce a new current refined image (process action 206). This continues until it is determined that the vignetting function estimate has converged (process action 208). At that point the last produced current refined image is designated as the final vignetting corrected image (process action 210).

A description of each of the foregoing processes actions, as well as the basis of the system and process will be provided in the sections that follow.

2.1 Vignetting Model

Most methods for vignetting correction use a parametric vignetting model to simplify estimation and minimize the influence of image noise. Typically used are empirical models such as polynomial functions and hyperbolic cosine functions. Existing models based on physical considerations include those which account for off-axis illumination and light path obstruction, and the Kang and Weiss model which additionally incorporates scene-based tilt effects. Tilt describes intensity variations within a scene region that are caused by differences in distance from the camera, i.e., closer points appear brighter due to the inverse square law of illumination. Although not intrinsic to the imaging system, the intensity attenuation effects caused by tilt must be accounted for in single-image vignetting estimation. Besides having physically meaningful parameters, an important property of physical models is that their highly structured and constrained form facilitates estimation in cases where data is sparse and/or noisy. In this work, an extension of the Kang-Weiss model is used, originally designed for a single planar surface of constant albedo, to multiple surfaces of possibly different color. Additionally, the linear model of geometric vignetting is generalized to a polynomial form.

2.2 Kang-Weiss Model

Consider an image with zero skew, an aspect ratio of 1, and principal point at the image center with image coordinates (u, v)=(0, 0). In the Kang-Weiss vignetting model, brightness ratios are described in terms of an off-axis illumination factor A, a geometric factor G, and a tilt factor T. For a pixel i at ($u_i$, $v_i$) with distance $r_i$ from the image center, the vignetting function φ is expressed as $$\phi_i = A_i G_i T_i = \theta_{r_i} T_i \text{ for } i=1 \ldots N, \quad (1)$$

where $$A_i = \frac{1}{(1 + (r_i/f)^2)^2}, \quad (2)$$

$$G_i = (1 - \alpha_1 r_i),$$

$$\theta_{r_i} = A_i G_i,$$

$$T_i = \cos \tau \left(1 + \frac{\tan \tau}{f}(u_i \sin \chi - v_i \cos \chi)\right)^3.$$

Figure 3:
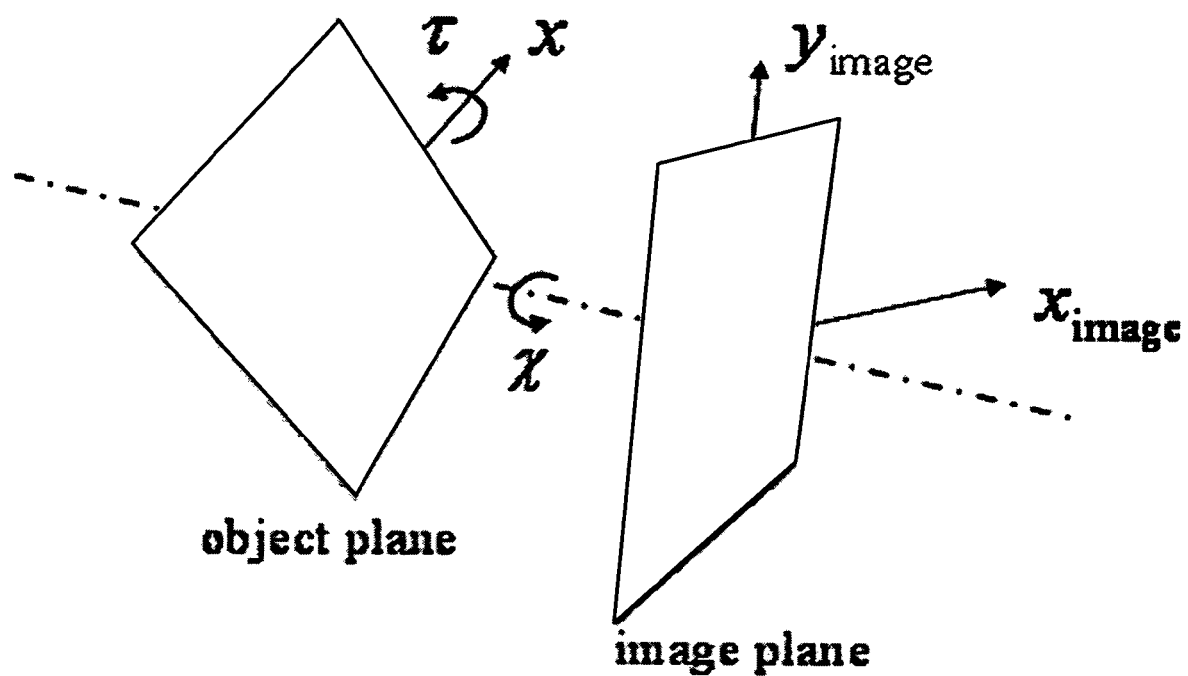
FIG. 3 is a diagram illustrating the geometry associated with the Kang-Weiss vignetting model tilt factor.

N is the number of pixels in the image, f is the effective focal length of the camera, and $\alpha_1$ represents a coefficient in the geometric vignetting factor. The tilt parameters χ and τ respectively describe the rotation angle of a planar scene surface around an axis parallel to the optical axis, and the rotation angle around the x-axis of this rotated plane, as illustrated in FIG. 3.

The model φ in Eq. (1) can be decomposed into the global vignetting function θ of the camera and the local tilt effects T in the scene. Note that θ is rotationally symmetric; thus, it can be specified as a 1D function of the radial distance $r_i$ from the image center.

2.3 Extended Vignetting Model

In an arbitrary input image, numerous segments with different local tilt factors may exist. To account for multiple surfaces in an image, an extension of the Kang-Weiss model is employed in which different image segments can have different tilt angles. The tilt factor of Eq. (2) is modified to $$T_i = \cos \tau_{s_i} \left(1 + \frac{\tan \tau_{s_i}}{f}(u_i \sin \chi_{s_i} - v_i \cos \chi_{s_i})\right)^3, \quad (3)$$

where $s_i$ indexes the segment containing pixel i.

The linear geometric factor is also extended to a more general polynomial form:

$$G_i = (1 - \alpha_1 r_i - \ldots - \alpha_p r_i^p), \quad (4)$$

where p represents a polynomial order that can be arbitrarily set according to a desired precision. This generalized representation provides a closer fit to the geometric vignetting effects observed in practice. In contrast to using a polynomial as the overall vignetting model, representing only the geometric component by a polynomial allows the overall model to explicitly account for local tilt effects and global off-axis illumination.

2.4 Vignetting Energy Function

Let the scene radiance $I_s$ of a segment s be expressed by its ratio $\lambda_s$ to the scene radiance $I_0$ of the center pixel, i.e., $I_s = \lambda_s I_0$. Given an image with M segments of different scene radiance, the vignetting solution can be formulated as the minimization of the following energy function:

$$E = \sum_{x=1}^{M} \sum_{i=1}^{N_s} w_i (\lambda_s I_0 T_i \theta_{r_i} - z_i)^2, \quad (5)$$

where i indexes the $N_s$ pixels in segment s, $z_i$ is the pixel value in the vignetted image, and $w_i$ is a weight assigned to pixel i. In color images, z represents an RGB vector. For ease of explanation, z is expressed herein as a single color channel, and overall energies are averaged from separate color components.

In this energy function, the parameters to be estimated are the focal length f in the off-axis component, the α coefficients of the geometric factor, the tilt angles $\tau_s$ and $\chi_s$, the scene radiance of the center pixel $I_0$, and the radiance ratio $\lambda_s$ of each segment. In processing multiple image segments, minimization of this energy function can intuitively be viewed as simultaneously solving for local segment parameters $I_s$, $\tau_s$ and $\chi_s$ that give a smooth alignment of vignetting attenuations between segments, while optimizing the underlying global vignetting parameters f, $\alpha_1$, ..., $\alpha_p$. With the estimated parameters, the vignetting corrected image is then given by $z_i/\theta_{r_i}$. Note that the local tilt factor is retained in the corrected image so as not to produce an unnatural-looking result.

Although typical images are considerably more complex than the uniform planar surfaces considered in this formulation, it will later be described how vignetting data in an image can be separated from other intensity variations such as texture, and how the weights w are set to enable robust use of this energy function.

2.5 Vignetting Correction

Figure 4:
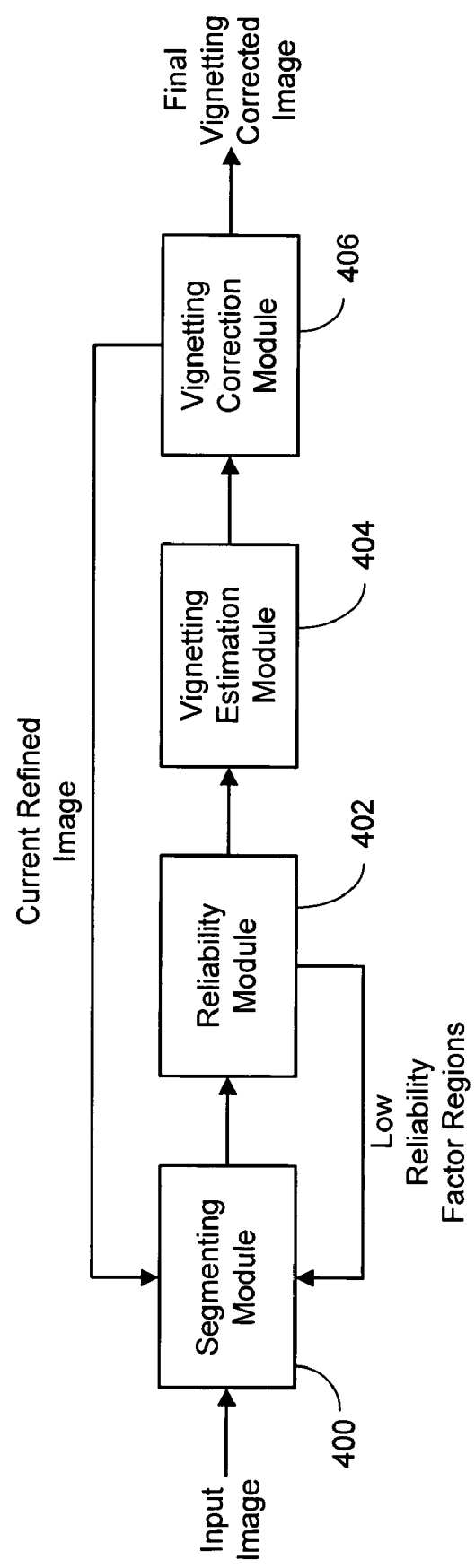
FIG. 4 is a diagram depicting the computer program modules making up one embodiment of a vignetting correction system according to the present invention.

One embodiment of the present computer-based system to correct for vignetting in an image is based on the program modules depicted in FIG. 4. In each iteration, the input image is first segmented at a coarse scale using a segmentation module 400, and for each segment a reliability measure of the segment data for vignetting estimation is computed via the reliability module 402. For segments that exhibit greater consistency with physical vignetting characteristics and with other segments, a higher reliability factor is assigned by module 402. Low reliability factors may indicate segments with multiple distinct surfaces, so these segments are recursively segmented by the segmentation module 400 at incrementally finer segmentation scales until the reliability factors of the smaller segments exceed a threshold or segments becomes negligible in size. With this segmentation approach, the segmentation scale varies spatially in a manner that facilitates collection of vignetting data.

After spatially adaptive segmentation, segments with high reliability factors are used by the vignetting estimation module 404 to estimate the vignetting function parameters. Since the preceding segmentations may be corrupted by the presence of vignetting, the subsequent iteration of the procedure re-computes segmentation boundaries from a refined image corrected by the vignetting correction module 406 using the current vignetting estimate. Better segmentation results lead to improved vignetting estimates, and these iterations are repeated until the estimates converge. At convergence, the last computed vignetting function is applied by the vignetting correction module 406 to the input image to produce a final vignetting corrected image.

Figure 5A:
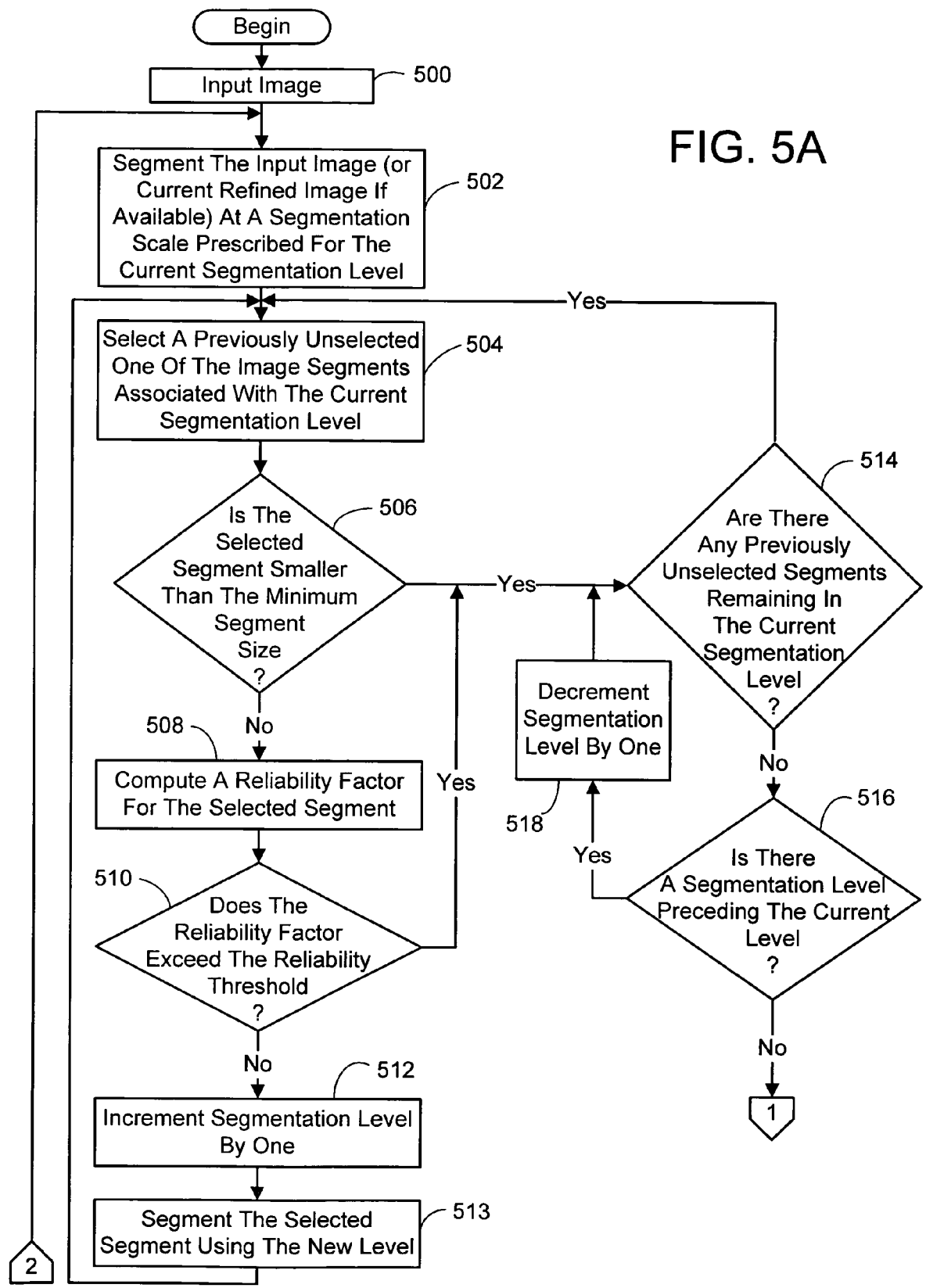
FIGS. 5A-B are a continuing flow chart diagramming a process to correct for vignetting in an image which represents one way of implementing the vignetting correction system of FIG. 4.
Figure 5B:
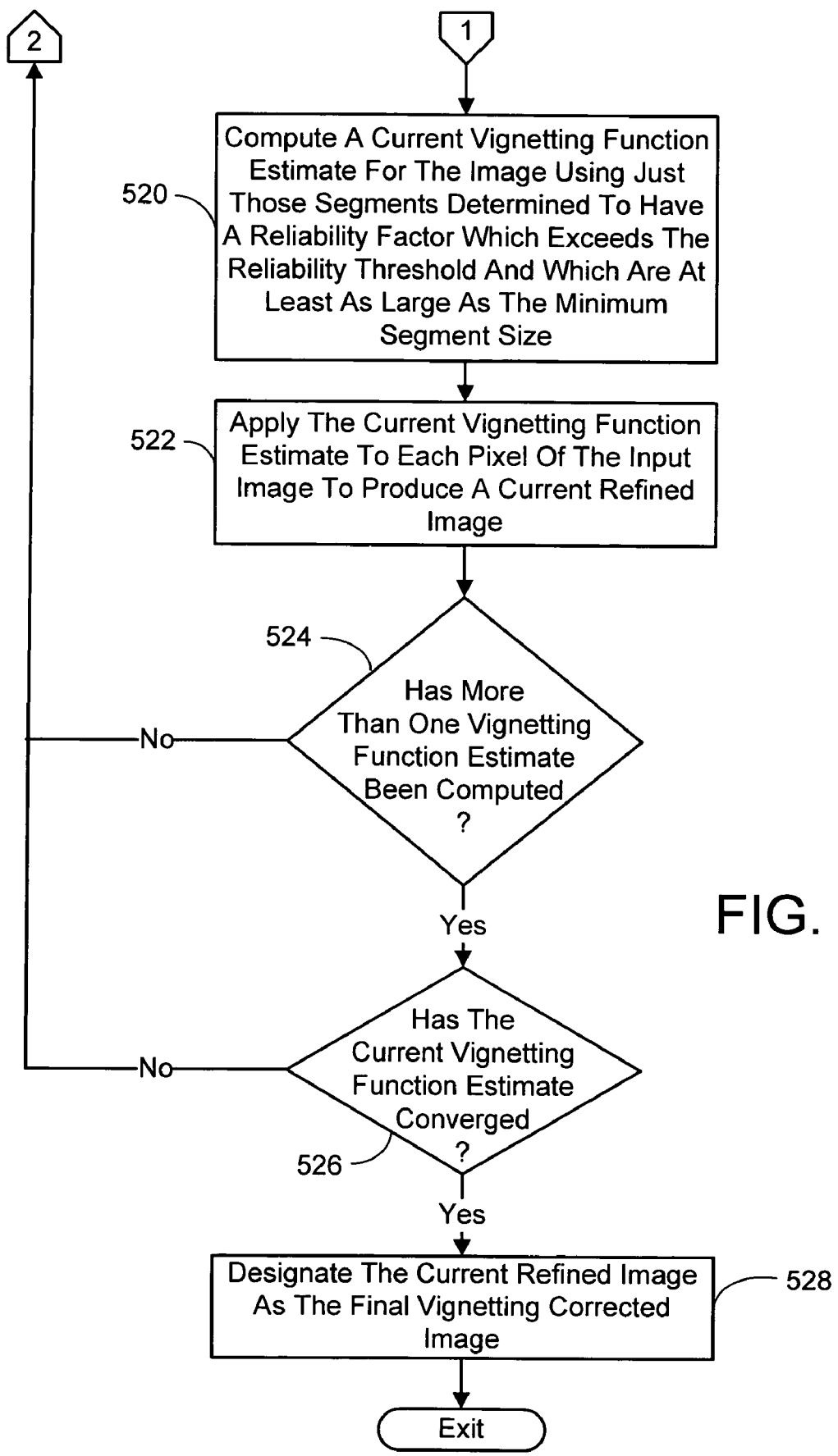

One way of implementing the foregoing system is outlined in the process flow diagram of FIGS. 5A-B. First, in process action 500, the image that is to be corrected is input. The input image (or a current refined image if in existence) is then segmented at a segmentation scale prescribed for the current segmentation level (process action 502), and a previously unselected one of the resulting image segments associated with the current segmentation level is selected (process action 504). Initially, the current segmentation level is the first level. The significance of the segmentation level will become apparent shortly. In addition, as described previously, the segmentation scale becomes finer with each successive segmentation level. It is next determined whether the size of the selected segment (e.g., as measured by the number of pixels in the segment) is smaller than a prescribed minimum segment size (process action 506). If not, then a reliability factor is computed for the selected segment in process action 508. As indicated previously, this reliability factor represents the degree to which the segment exhibits consistency with physical vignetting characteristics and conforms to vignetting observed in other segments. It is next determined if the reliability factor exceeds the prescribed reliability threshold (process action 510). As described above, this threshold is indicative of whether a segment is acceptable for vignetting estimation purposes. If it is determined that the reliability factor does not exceed the reliability threshold, then the segmentation level is incremented by one (process action 512) and the selected segment is segmented using the incremented segmentation scale (process action 513). Process actions 502 through 518 are then performed as appropriate. In this way the selected segment is divided using a finer segmentation scale assigned to the new segmentation level resulting in two or more smaller segments.

However, if it is determined in process action 506 that the size of the selected segment is smaller than the minimum segment size, or it is determined in process action 510 that the reliability factor does exceed the reliability threshold, then it is determined whether there are any previously unselected segments remaining in the current segmentation level (process action 514). If so, then process actions 504 through 518 are repeated as appropriate to consider other segments in the current level. However, if there are no previously unselected segments remaining in the current segmentation level, then it is determined if there is a segmentation level preceding the current level (process action 516). If there is, the segmentation level is decremented by one (process action 518), and process actions 502 through 518 are repeated as appropriate starting with process action 514 as shown in FIG. 5A.

If, however, it is determined in process action 516 that there are no segmentation levels preceding the current level, then the process continues with the computation of a current vignetting function estimate for the image using just those segments determined to have a reliability factor which exceeds the reliability threshold and which are at least as large as the minimum segment size (process action 520). As described previously, the vignetting function defines a corrected intensity for each pixel of the input image. The current vignetting function estimate is then applied to each pixel of the input image to produce a current refined image (process action 522). Next, it is determined if more than one vignetting function estimate has been computed (process action 524). If so, then it is determined if the current vignetting function estimate has converged (process action 526). As described earlier, the vignetting function estimate has converged if it has not changed more than a prescribed amount in the last iteration. If it is determined that the vignetting function estimate has converged, the current refined image is designated as the final vignetting corrected image (process action 528) and the process ends. However, if in process action 524 it is determined that more than one vignetting function estimate has not been computed, or it is determined in process action 526 that the current vignetting function estimate has not converged, then process actions 502 through 528 are repeated as appropriate for each successive iteration of the correction process until the vignetting function estimate converges.

The major components of the vignetting correction system and process will now be described in more detail in the following sections.

2.5.1 Vignetting-Based Image Segmentation

To obtain information for vignetting estimation, pixels having the same scene radiance need to be identified in the input image. The present system and process addresses this problem with unique adaptations to existing segmentation methods. To facilitate the location of reliable vignetting data, segmentation scales are spatially varied over the image, and the adverse effects of vignetting on segmentation are progressively reduced as the vignetting function estimate is refined.

2.5.1.1 Spatial Variations in Scale

Sets of pixels with the same scene radiance provide more valuable information if they span a broader range of vignetting attenuations. In the context of segmentation, larger segments are therefore preferable. While relatively large segments can be obtained with a coarse segmentation scale, many of these segments may be unreliable for vignetting estimation since they may contain multiple surfaces or include areas with non-uniform illumination. In an effort to gain useful data from an unreliable segment, the present system and process recursively segments it into smaller segments that potentially consist of better data for vignetting estimation. This recursive segmentation proceeds until segments have a high reliability weight or become of negligible size according to a threshold (such as 225 pixels as used in tested embodiments). Segments of very small size generally contain insignificant changes in vignetting attenuation, and the inclusion of such segments would bias the optimization process.

In the recursive segmentation procedure, incrementally finer scales of segmentation are used. For methods such as mean shift and segment competition, segmentation scale is controlled by a parameter on variation within each feature class, where a feature may simply be pixel intensity or color. With such approaches, a finer partitioning of a low-weight segment can be obtained by segmenting the segment with a decreased parameter value. In other techniques such as graph cuts and Blobworld, the degree of segmentation is set according to a given number of feature classes in an image. There exist various ways to set the number of classes, including user specification, data clustering, and minimum description length criteria. For recursive segmentation, since each segment belongs to a certain class, a finer partitioning of the segment can be obtained by segmenting it with the number of feature classes specified as two.

With this general adaptation, segmentation scale varies over an image in a manner designed to maximize the quality of vignetting data. In tested embodiments, graph cut segmentation was employed with per-pixel feature vectors composed of six color/texture attributes. The color components are the RGB values, and the local texture descriptors are the polarity, anisotropy and normalized texture contrast.

2.5.1.2 Accounting for Vignetting

Two pixels of the same scene radiance may exhibit significantly different image intensities due to variations in vignetting attenuation. In segmentation, a consequence of this vignetting is that a homogeneous scene area may be divided into separate image segments. Vignetting may also result in heterogeneous image areas being segmented together due to lower contrasts at greater radial distances. For better stability in vignetting estimation, the effects of vignetting on segmentation should be minimized.

To address vignetting effects in segmentation, after each iteration, the estimated vignetting function is accounted for in segmentations during the subsequent iteration. Specifically, the vignetting corrected image computed with the currently estimated parameters is used in place of the original input image in determining segmentation boundaries. The corrected image is used only for segmentation purposes, and the colors in the original image are still used for vignetting estimation.

As the segmentations improve from reduced vignetting effects, the estimated vignetting function also is progressively refined. This process is repeated until the difference between vignetting functions in consecutive iterations falls below a prescribed threshold, where the difference is measured as $$\Delta \vartheta = \frac{1}{k} \sum_r \|\vartheta(t) - \vartheta_r(t-1)\|. \tag{6}$$

$\theta(t)$ represents the global vignetting function at iteration t, and radial distances r are sampled at k uniform intervals. In tested embodiments, k was set to 100.

2.5.2 Segment Weighting

To guide the vignetting-based segmentation process and promote robust vignetting estimation, the reliability of data in each image segment is evaluated and used as a segment weight. A segment is considered to be reliable if it exhibits consistency with physical vignetting characteristics and conforms to vignetting observed elsewhere in the image.

Initially, no vignetting estimates are known, so reliability is measured in the first iteration according to how closely the segment data can be represented by the physically-based vignetting model. For a given segment, an estimate $\theta'$ of the vignetting function is computed similarly to the technique to be described in Section 2.5.3, and the weight for segment s is computed as $$w_s = \frac{1}{N_s} \exp\left\{ -\sum_{i=1}^{N_s} \left\| \vartheta'_{r_i} - \frac{z_i}{\lambda_s I_0 T_i} \right\| \right\}. \tag{7}$$

Each pixel is assigned the weight of its segment.

The presence of texture in a segment does not preclude it from having a high weight. In contrast to textures which typically exhibit high frequency variations, vignetting is a low frequency phenomenon with a wavelength on the order of the image width. This difference in frequency characteristics allows vignetting effects to be discerned in many textured segments.

At the end of each iteration, an estimate of the vignetting function is determined and used as $\theta'$ in the following iteration. As the vignetting parameters are progressively refined, computed weights will more closely reflect the quality of segment data. In cases where the texture or shading in a segment coincidentally approximates the characteristics of vignetting, it will be assigned a low weight if it is inconsistent with the vignetting observed in other parts of the image.

2.5.3 Vignetting Estimation

For a collection of segments, the many unknown parameters create a complicated solution space. To simplify optimization, a stepwise method is used for parameter initialization prior to estimating the vignetting function. In the first step, initial values of relative scene radiances $\lambda_s$ are determined for each segment without consideration of vignetting and tilt parameters. For pixels i and j at the same radius r but from different segments, their vignetting attenuation should be equal, so their image values $z_i$ and $z_j$ should differ only in scene radiance. Based on this property, relative scene radiance values are initialized by minimizing the function $$E_1 = \sum_r \sum_{r_i, r_j = r, s_i \neq s_j} w_i w_j \left( \frac{z_i}{\lambda_{s_i}} - \frac{z_j}{\lambda_{s_j}} \right)^2.$$

The $\lambda_s$ values are solved in the least squares sense by singular value decomposition (SVD) on a system of equations $$\sqrt{w_i w_j} \left( \frac{z_i}{\lambda_{s_i}} - \frac{z_j}{\lambda_{s_j}} \right) = 0$$

where $$\frac{1}{\lambda_{s_i}}$$

and $$\frac{1}{\lambda_{s_j}}$$

are unknowns. To expedite minimization of this function, a set of pixels at a given radius and within the same segment may be represented by a single pixel with the average color of the set.

With the initial values of $\lambda_s$, the second step initializes the parameters $f$, $I_0$, and $\alpha_1, \ldots, \alpha_p$, where p is the polynomial order used in the geometric factor of Eq. 4. Ignoring local tilt factors, this is computed with the energy function $$E_2 = \sum_{s=1}^{M} \sum_{i=1}^{N_s} w_i (\lambda_s I_{0i} \vartheta_{r_i} - z_i)^2. \tag{8}$$

This function is iteratively solved by incrementally increasing the polynomial order from k=1 to k=p, and using the previously computed polynomial coefficients $\alpha_1, \ldots, \alpha_{k-1}$ as initializations. In tested embodiments, a polynomial order of p=4 was employed.

In the third step, the local tilt parameters $\tau_s, \chi_s$ are estimated by optimizing the energy function in Eq. 5 with the other parameters fixed to their initialization values. After this initialization stage, all the parameters are jointly optimized in Eq. 5 to finally estimate the vignetting function. The optimizations of Eq. 5 and Eq. 8 are computed using the Levenberg-Marquardt technique.

Although the subject matter has been described in language specific to structural features and/or methodological acts, it is understood that the subject matter defined in the appended claims is not necessarily limited to the specific features or acts described above. Rather, the specific features and acts described above are disclosed as example forms of implementing the claims.

Wherefore, what is claimed is:

1. A computer-implemented process to correct for vignetting in an input image, comprising using a computer to perform the following process actions:
    segmenting the input image using a spatially varying segmentation scale which produces a plurality of reliable segments exhibiting vignetting that is consistent with prescribed physical vignetting characteristics and that conforms to vignetting observed in other segments;
    estimating a vignetting function for the input image using the reliable segments, which defines a corrected intensity for each pixel;
    applying the last-computed vignetting function estimate to each pixel of the input image to produce a current refined image;
    repeating the segmenting action using the current refined image in lieu of the input image, and repeating the estimating and applying process actions using the input image to produce a new current refined image, until it is determined that the vignetting function estimate has converged; and
    whenever it is determined that the vignetting function estimate has converged, designating the last produced current refined image to be a final vignetting corrected image.

2. The process of claim 1, wherein the process action of segmenting the input image or segmenting the current refined image, comprises the actions of:
    segmenting the image at a prescribed initial segmentation scale;
    for each segment,
        computing a reliability factor which represents the degree to which the segment exhibits consistency with physical vignetting characteristics and conforms to vignetting observed in other segments,
        determining if the reliability factor exceeds a prescribed reliability threshold which indicates the segment is acceptable for vignetting estimation, and
        whenever the reliability factor does not exceed the reliability threshold, recursively segmenting the segment under consideration at increasingly finer segmentation scales until each of the resulting smaller segments has a reliability factor that exceeds the reliability threshold or becomes less than a prescribed minimum segment size; and
    designating those segments determined to have a reliability factor which exceeds the reliability threshold and which are at least as large as the minimum segment size to be reliable segments.

3. The process of claim 2, wherein the process action of recursively segmenting the segment under consideration, comprises the actions of:
    (a) segmenting the segment under consideration using a finer segmentation scale than that last employed on the segment to produce a plurality of smaller segments;
    (b) for each smaller segment produced, computing its reliability factor and determining if the factor exceeds the reliability threshold;
    (c) whenever the reliability factor of the smaller segment under consideration does not exceed the reliability threshold, determining if the size of the smaller segment is less than a prescribed minimum segment size; and
    (d) whenever the smaller segment under consideration exceeds the minimum segment size, repeating process actions (a) through (c) for that smaller segment.

4. The process of claim 3, wherein the process actions of segmenting the input image, segmenting current refined image, and segmenting a segment of either, comprises an action of employing a graph cut segmentation technique with per-pixel feature vectors composed of six color/texture attributes.

5. The process of claim 4, wherein the color attributes of the per-pixel feature vectors are the RGB values.

6. The process of claim 4, wherein the texture attributes of the per-pixel feature vectors are the polarity, anisotropy and normalized texture contrast.

7. The process of claim 2, wherein the process action of estimating a vignetting function for the input image comprises estimating a function which for each pixel of the image, estimates the effects of both global vignetting that varies with only the radial distance of the pixel from the image center and the vignetting caused by the tilt of surfaces depicted by the pixel in relation to the optical axis and image plane.

8. The process of claim 7, wherein the process action of estimating the effects of global vignetting on a pixel of the image, comprises computing the product of an off-axis illumination factor ($A_i$) and a geometric factor ($G_i$) for pixel (i), wherein $$A_i = \frac{1}{(1 + (r_i/f)^2)^2}$$

where $r_i$ is the radial distance of pixel i from the image center and f is the effective focal length of the camera that captured the image, and wherein $G_i = (1 - \alpha_1 r_i - \ldots - \alpha_p r_i^p)$ where p represents a prescribed polynomial order and $\alpha_{1 \ldots p}$ represent geometric coefficients.

9. The process of claim 7, wherein the process action of estimating the effects of the vignetting caused by the tilt of surfaces depicted by the pixel, comprises computing a tilt factor $T_i$ for pixel (i) as $$T_i = \cos\tau_{s_i}\left(1 + \frac{\tan\tau_{s_i}}{f}(u_i\sin\chi_{s_i} - v_i\cos\chi_{s_i})\right)^3,$$

where $s_i$ indexes the image segment containing pixel i, $u_i$ and $v_i$ are the image coordinates of pixel i, f is the effective focal length of the camera that captured the image, $\chi_{s_i}$ is a first tilt parameter representing the rotation angle of a planar scene surface depicted in the segment containing pixel i around an axis parallel to the optical axis and $\tau_{s_i}$ is a second tilt parameter representing the rotation angle of a planar scene surface depicted in the segment containing pixel i in relation to the image plane.

10. The process of claim 2, wherein the process action of estimating a vignetting function for the input image, comprises the actions of:
minimizing an energy function (E) defined as $$E = \sum_{s=1}^{M}\sum_{i=1}^{N_s} w_i(\lambda_s I_0 T_i \vartheta_{r_i} - z_i)^2,$$

where M represents the total number of image segments s, $N_s$ represents the total number of pixels i in segment s, $w_i$ represents the reliability factor computed for the segment s containing pixel i, $\lambda_s$ is a ratio of the scene radiance $I_s$ of segment s to the scene radiance $I_0$ of the center pixel, $T_i$ represents the vignetting caused by the tilt of surfaces depicted by pixel i in relation to the optical axis and image plane, $\theta_{r_i}$ is the portion of the last-computed vignetting function estimate attributable to global vignetting effects ignoring any local tilt effects on vignetting at radial distance r of pixel i from the image center and $z_i$ is a pixel value of pixel i; and
defining the estimated vignetting function such that the corrected intensity of each pixel i is given by $z_i/\theta_{r_i}$.

11. The process of claim 10, wherein the input image is a color image and the pixel value $z_i$ of pixel i represents a RGB vector.

12. The process of claim 2, wherein the process action of computing a reliability factor for a segment comprises an action of computing the factor ($w_s$) as $$w_s = \frac{1}{N_s}\exp\left\{-\sum_{i=1}^{N_s}\left\|\vartheta'_{r_i} - \frac{z_i}{\lambda_s I_0 T_i}\right\|\right\}$$

where i indexes the $N_s$ pixels in segment s, $\theta_{r_i}'$ is the portion of the last-computed vignetting function estimate attributable to global vignetting effects ignoring any local tilt effects on vignetting at radial distance r of pixel i from the image center, $z_i$ is a pixel value of pixel i, $\lambda_s$ is a ratio of the scene radiance $I_s$ of segment s to the scene radiance $I_0$ of the center pixel, and $T_i$ represents the vignetting caused by the tilt of surfaces depicted by pixel i in relation to the optical axis and image plane.

13. The process of claim 10, wherein the input image is a color image and the pixel value $z_i$ of pixel i represents a RGB vector.

14. The process of claim 1, wherein the process action of determining if the vignetting function estimate has converged comprises an action of determining if the last-computed vignetting function estimate has changed more than a prescribed amount when compared to the next to last computed vignetting function estimate.

15. The process of claim 14, wherein the process action of determining if the last-computed vignetting function estimate has changed more than a prescribed amount when compared to the next to last computed vignetting function estimate, comprises an action of computing a difference ($\Delta\theta$) between the last-computed vignetting function estimate and the next to last computed vignetting function estimate as $$\Delta\vartheta = \frac{1}{k}\sum_r \|\vartheta_r(t) - \vartheta_r(t-1)\|$$

where θ(t) is the portion of the last-computed vignetting function estimate attributable to global vignetting effects ignoring any local tilt effects on vignetting, θ(t−1) is the portion of the next to last computed vignetting function estimate attributable to the global vignetting effects ignoring any local tilt effects on vignetting, and radial distances r are sampled at k prescribed uniform intervals.

16. A computer-readable medium having computer-executable instructions for performing the process actions recited in claim 1.

17. A computer-implemented process to correct for vignetting in an input image, comprising using a computer to perform the following process actions:
segmenting the input image using a spatially varying segmentation scale which produces a plurality of segments exhibiting vignetting that is consistent with prescribed physical vignetting characteristics and that conforms to vignetting observed in other segments;
estimating a vignetting function for the input image which defines a corrected intensity for each pixel using segments determined to have a reliability factor which exceeds a reliability threshold and which are at least as large as a minimum segment size;
applying the last-computed vignetting function estimate to each pixel of the input image to produce a current refined image;
determining if there has been more than one vignetting function estimated;
whenever more than one vignetting function has been estimated, determining if the last-computed vignetting function estimate has changed more than a prescribed amount when compared to the next to last computed vignetting function estimate;
whenever it is determined that more than one vignetting function has not been estimated, or that more than one vignetting function has been estimated but the last-computed vignetting function estimate has changed more than the prescribed amount, segmenting the a current refined image using said spatially varying segmentation scale, and repeating the estimating, applying, first determining and second determining process actions; and
whenever it is determined that more than one vignetting function has been estimated, and that the last-computed vignetting function estimate has not changed more than the prescribed amount, designating the last produced refined image as a final vignetting corrected image.

18. The process of claim 17, wherein the process action of segmenting the input image, comprises the actions of:
(a) segmenting the input image at a prescribed current segmentation scale starting with an initial segmentation scale;

(b) selecting a previously unselected one of the resulting segments associated with the current segmentation scale;
(c) determining if the size of the selected segment is smaller than a prescribed minimum segment size;
(d) whenever the segment under consideration is not smaller than the prescribed minimum segment size,
   (d1) computing a reliability factor which represents the degree to which the segment exhibits consistency with prescribed physical vignetting characteristics and conforms to vignetting observed in other segments,
   (d2) determining if the reliability factor exceeds a prescribed reliability threshold which indicates the segment is acceptable for vignetting estimation, and
   (d3) whenever the reliability factor does not exceed the reliability threshold,
      (i) incrementing the segmentation scale by one level, wherein each successive segmentation level represents a finer segmentation scale than that employed to form the selected segment,
      (ii) segmenting the selected segment using the incremented segmentation scale, and
      (iii) repeating process actions (b) through (d) as appropriate; and
(e) whenever the segment under consideration is smaller than the prescribed minimum segment size, or it is not smaller but the reliability factor exceeds the reliability threshold,
   (e1) determining if there are any previously unselected segments associated with the current segmentation scale,
   (e2) whenever there are previously unselected segments associated with the current segmentation scale, repeating process actions (b) through (e) as appropriate,
   (e3) whenever there are no previously unselected segments associated with the current segmentation scale, determining if there is a segmentation level preceding the current level,
   (e4) whenever there is a segmentation level preceding the current level, decreasing the segmentation level by one unit and repeating process actions (e1) through (e4) as appropriate, and
   (e5) whenever there is no segmentation level preceding the current level, deeming the segmentation of the input image to be complete.

19. The process of claim 17, wherein the process action of segmenting the current refined image, comprises the actions of:
(a) segmenting the current refined image at a prescribed current segmentation scale starting with an initial segmentation scale;
(b) selecting a previously unselected one of the resulting segments associated with the current segmentation scale;
(c) determining if the size of the selected segment is smaller than a prescribed minimum segment size;
(d) whenever the segment under consideration is not smaller than the prescribed minimum segment size,
   (d1) computing a reliability factor which represents the degree to which the segment exhibits consistency with prescribed physical vignetting characteristics and conforms to vignetting observed in other segments,
   (d2) determining if the reliability factor exceeds a prescribed reliability threshold which indicates the segment is acceptable for vignetting estimation, and
   (d3) whenever the reliability factor does not exceed the reliability threshold,
      (i) incrementing the segmentation scale by one level, wherein each successive segmentation level represents a finer segmentation scale than that employed to form the selected segment,
      (ii) segmenting the selected segment using the incremented segmentation scale, and
      (iii) repeating process actions (b) through (d) as appropriate; and
(e) whenever the segment under consideration is smaller than the prescribed minimum segment size, or it is not smaller but the reliability factor exceeds the reliability threshold,
   (e1) determining if there are any previously unselected segments associated with the current segmentation scale,
   (e2) whenever there are previously unselected segments associated with the current segmentation scale, repeating process actions (b) through (e) as appropriate,
   (e3) whenever there are no previously unselected segments associated with the current segmentation scale, determining if there is a segmentation level preceding the current level,
   (e4) whenever there is a segmentation level preceding the current level, decreasing the segmentation level by one unit and repeating process actions (e1) through (e4) as appropriate, and
   (e5) whenever there is no segmentation level preceding the current level, deeming the segmentation of the current refined image to be complete.

20. A computer-based system for correcting vignetting in an input image, comprising:
a segmentation module which segments the input image using a spatially varying segmentation scale;
a reliability module which determines if an image segment is reliable;
a vignetting estimation module which estimates a vignetting function for the image using the reliable segments; and
a vignetting correction module which comprises sub-modules for,
   applying the last-computed vignetting function estimate to the input image to produce a current refined image,
   determining if the vignetting function estimate has converged,
   causing, whenever the vignetting function estimate has not converged, the current refined image to be segmented using the segmentation and reliability modules, the vignetting estimation module to re-estimate the vignetting function for the input image which is then applied to input image to produce a new current refined image, determining again if the vignetting function has converged and re-executing the causing sub-module whenever the vignetting function estimate still has not converged, and
   designating the last produced current refined image to be a final vignetting corrected image, whenever the vignetting function estimate has converged.

* * * * *